Sept. 25, 1951  D. C. WILLIAMS  2,568,839
ICE-CREAM FREEZER
Filed May 24, 1949  2 Sheets-Sheet 1
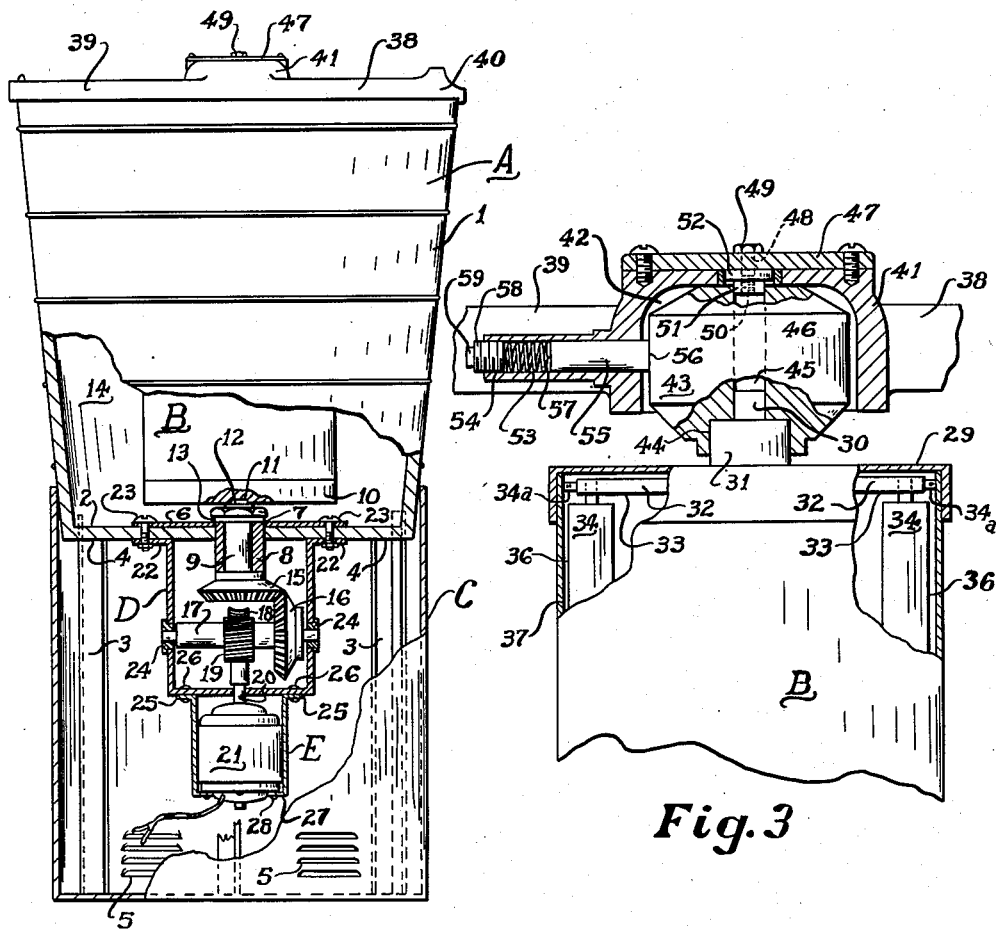
Fig. 1
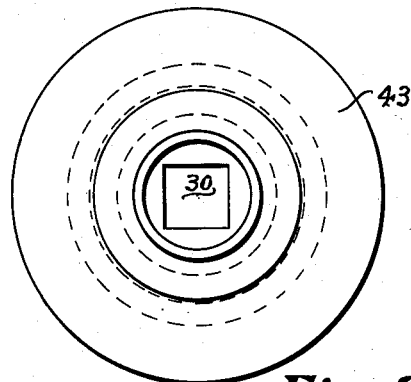
Fig. 2
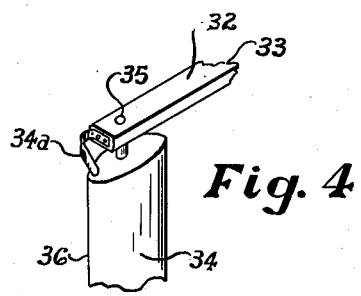
Fig. 3
Fig. 4
INVENTOR.
David C. Williams
BY
ATTORNEYS.

Sept. 25, 1951 D. C. WILLIAMS 2,568,839
ICE-CREAM FREEZER
Filed May 24, 1949 2 Sheets-Sheet 2
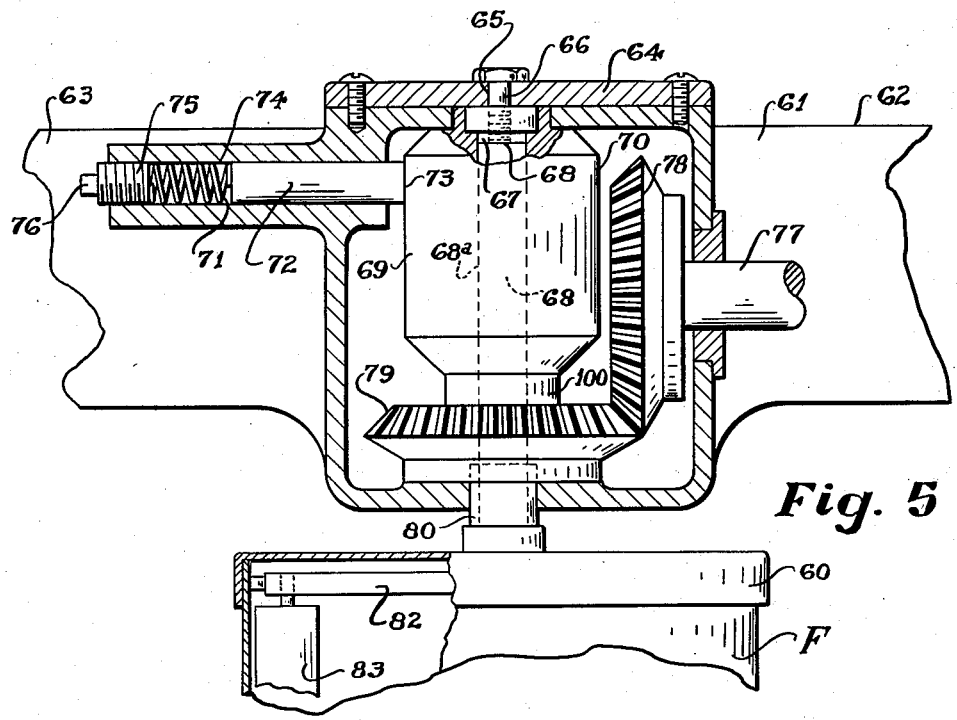
Fig. 5
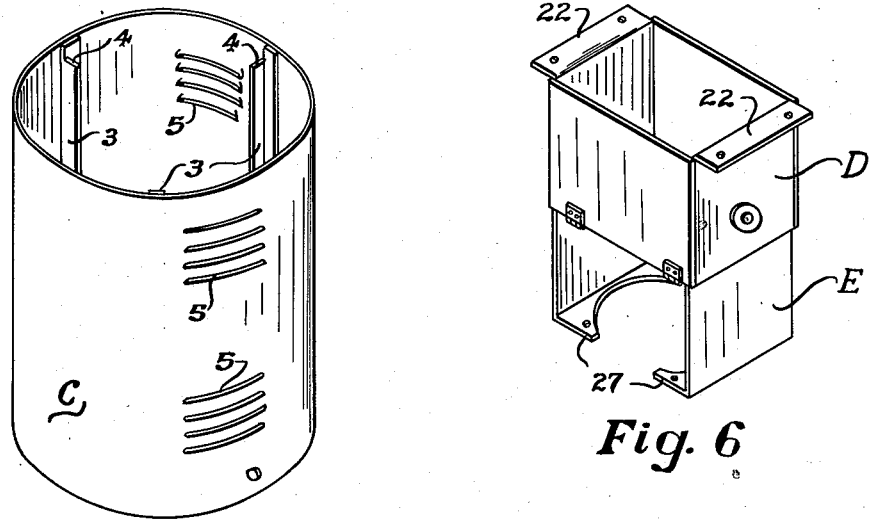
Fig. 7
Fig. 6
INVENTOR.
David C. Williams
BY
ATTORNEYS.

Patented Sept. 25, 1951

2,568,839

UNITED STATES PATENT OFFICE 2,568,839

ICE-CREAM FREEZER

David C. Williams, Big Stone Gap, Va.

Application May 24, 1949, Serial No. 95,005

4 Claims. (Cl. 259—53)

This invention is an improvement of the invention disclosed in my Patent 2,148,333 granted February 21, 1939, for a power driven ice cream freezer.

An object of the present invention is to provide a power driven freezer with means for relieving the increasing torque, which increase of torque is due to the solidification of the ice cream mix as the freezing operation progresses.

Another object of the invention is to provide a slip clutch which permits turning of the dasher with the freezer when the ice cream mix becomes partially solidified.

Yet another object of the invention is to provide, in connection with the structure recited in the preceding paragraph, of a visual signal when the ice cream mix is frozen, or partially frozen.

A further object of the invention is to provide a power driven ice cream freezer having means for rotating the inside casing of the freezer by the power means, and a clutch connected with the dasher, whereby the dasher is held stationary until the ice cream mix becomes solidified or partially solidified, whereupon the dasher is allowed to rotate, thus decreasing the torque on the said casing rotating means.

Yet another object of the invention is to provide in an ice cream freezer a device provided with means for holding the dasher stationary and with means for driving the inside casing containing the ice cream mix, the said first named means including a slip clutch directly connected to the dasher which permits the dasher to rotate when the mix starts to solidify and after solidification of the mix.

Another object is to provide a freezer provided with a dasher having blades with means for forcing the blades resiliently into contact with the inner sides of the inner casing.

Other objects will appear hereinafter through the specification.

In the drawings:

Figure 1 is an elevational view of the preferred form of the invention with parts broken away and shown in section, showing the drive for the inside casing.

Figure 2 is an enlarged top plan view of the clutch member.

Figure 3 is a side elevational view of the inside of the mix casing and the clutch with parts broken away to show the construction thereof.

Figure 4 is a perspective view of the dasher and the support therefor with parts broken away.

Figure 5 is an elevational view with parts broken away and shown in section, of a second embodiment of the invention.

Figure 6 is a perspective view of the combined motor and transmission casing, and Figure 7 is a perspective view of the lower supporting casing.

It has been determined after much experiment that motor driven freezers often break down because of the increasing torque due to the increased resistance to the turning of the inner or mix casing, due to the solidification of the ice cream mix. The dasher in the majority of prior devices is held stationary to enhance the simplicity of the drive, during the entire freezing operation, and the mix upon freezing is held from rotating by the arms of the dasher. The present invention relieves the strain put on the motor when the mix becomes solidified by means of a construction that includes a slip clutch. This slip clutch permits the dasher to turn when the mix becomes solidified, so that the inner or mix casing, the mix in this casing and the dasher all rotate.

The present invention, while directed particularly to a motor driven freezer, is not limited to a motor driven freezer as the freezer may be driven by hand. However, the invention is particularly adapted for a motor driven freezer.

Referring to Figure 1, the letter A indicates the outer casing of the freezer. This outer casing supports the inner, or ice cream mix casing B, the driving mechanism and motor hereinafter described. The outer casing A is supported by the lower supporting casing C, shown in Figures 1 and 7.

The casing A is provided with generally sloping sides 1 and the bottom 2 which forms the support for the casing B and the driving mechanism. Casing A is adapted to fit within the lower supporting casing C as shown in Figure 1. As shown in Figures 1 and 7, the supporting casing C is provided with circumferentially spaced angle members 3. Each angle member has a seat 4, usually three in number. These seats or steps are all of the same height and they support the bottom 2 of the casing A and keep this casing in an upright position as indicated in Figure 1. Supporting casing C is provided with a plurality of louvers 5 which are also circumferentially spaced, as well as vertically spaced around the circular casing C. These louvers prevent overheating of the motor.

The top surface of the bottom 2 is provided with a plate 6 having central aperture 7 for shaft packing 8 for the shaft 9. The mix casing B has a lower end 10 of considerable thickness and the under portion of this end is provided with a spared aperture 11 for the reception of a squared stud 12 which forms the upper end of the shaft 9. There is a washer 13 which forms a thrust bearing and also acts as a seal to prevent fluid in space 14 between casings A and B, from finding its way into the gearing and motor located below. On the lower end of shaft 9 is a pinion gear 16 mounted on horizontal shaft 17. Also mounted on this shaft is a worm pinion 19 which is in meshed relationship with worm 18 that forms the upper end of the motor shaft 20. This motor shaft is rotated by the motor 21.

As seen in Figures 1 and 6, there is a transmission housing D and a motor housing E. The transmission housing is provided with flanges 22. Headed bolts 23 extend through apertures in plate 6 and through flanges 22. Housing D is provided with bearings 24 for worm gear shaft 17. The motor housing E is provided with apertured flanges 25 by means of which the motor housing may be detachably connected by bolts 26 to the under side of housing D as seen in Figure 1. The lower end of motor housing E is provided with turned in flanges 27 forming a support for the motor 21, which is preferably an electric motor. Bolts 28 are provided for rigidly supporting the motor in motor casing E. The motor 21 is provided with the usual bearings, not shown.

From the above description it will be appreciated that the various elements for driving the inner casing B may be easily accessible by removing the outer casing A from the supporting casing C and detaching casing E and casing D from each other, and casing D from the under side of the bottom 2.

Means is provided for resiliently pressing each blade of the dasher against the inner circular side of mix casing B. This construction is shown in Figures 3 and 4. As seen in Figure 3, the casing is provided with the usual removable top 29. The dasher is provided with a squared shoulder 30 that projects upwardly through an aperture in the top of the can. The lower portion of this shoulder is circular as at 31 so that a fairly tight fit will be made between it and the top 29, because before the ice cream mix becomes solidified the top 29 turns with relation to shoulder 31 but, upon solidification of the mix, both casing top 29 and circular portion 31 turn.

Rigidly attached to the circular portion 31 is the dasher 32 consisting of a pair of arms 33, only one of which is shown in Figure 3. The paddles 34 are pivoted at 35 to the dasher arm and each edge 36 is resiliently urged by spring 34a to engagement with the inner cylindrical portion 37 of casing B.

Freezer casing A is provided with a dasher support 40 which comprises arms 38 and 39 that extend radially across the upper or top portion of casing A and are removably attached in the usual manner to the upper sides 1 of casing A. The central portion 41 of the dasher support is provided with a hollow interior 42 which serves to house the clutch member 43. This clutch member is provided with a circular interior portion 44 with an upper squared interior 45. The periphery 46 of the clutch member 43 is in the shape of a cylinder. The central portion 41 has removable cap 47 which is provided with central aperture 48 that houses a bolt 49 whose upper portion is squared as seen in Figures 1 and 3. The lower portion of the nut is screw-threaded at 50 and there is a nut 51 which is screwed on to threaded portion. The nut is of squared configuration and engages the upper squared walls of the squared interior of the clutch member 43. The nut engages a washer 52 as seen in Figure 3.

Arm 39 has a hollow cylindrical passageway whose left end portion is screw threaded at 54. This passageway houses a plunger usually constructed of wood, one end 56 of which engages the periphery of the clutch member. Such engagement is assured by the coil spring 57 located in passageway 53, and the frictional engagement between the clutch member 43 and plunger 55 may be increased or decreased by adjustment of the screw threaded plug 58, which latter is provided with a squared head 59 whereby adjustment may be effected.

Operation

Assuming that mix casing B has been filled with the ice cream mix and the space 14 between the casings A and B is filled with ice and a suitable amount of ice cream salt, current to the motor 21 is turned on by a switch, not shown. With the parts in the position seen in Figures 1 and 3, the motor through the worm bevel gearing drives the inner casing B. During the first stage of the freezing operation the dasher is held stationary due to the engagement of a plunger 55 with the cylindrical portion of clutch member 43. Each blade 34 of the dasher is held resiliently in engagement with the inner wall 37 of casing B by its spring 34a, and in this position as the can B is turned, the ice cream is scraped off the inner wall 37.

As the mix in casing B gradually solidifies more and more, resistance is imposed on blades 34 by said mix, because the mix tends to turn with the casing B but this turning is opposed by the blades 34. When, however, the mix is substantially frozen, as determined by the adjustment of plunger 55 through plug 58, the resistance to the turning of clutch member 43 is finally overcome and the clutch member 43 begins to rotate. When this takes place, the bolt 49 also rotates because of its rigid connection with clutch 43, thus visually indicating that the mix has now become frozen.

Referring to the structure shown in Figure 5, it will be noted that the drive for the inner casing F is through the top of said casing in a manner similar to that shown in my patent referred to above, see Figures 1 or 6. The top of mix casing F is indicated by the numeral 60. The dasher support 61 has arms 62 and 63. The central portion is provided with a removable cap 64 having an aperture 65 for the bolt 66. The lower end of the bolt is screw threaded at 67. This screw threadedly engages a squared shaft 68 which extends upwardly through the squared opening 68a of the clutch member 69 which latter is provided with a cylindrical surface 70. The arm 63 is provided with a passageway 71 and a plunger 72 whose right end 73 frictionally engages the cylindrical portion 70. The plunger is urged toward the right by the coil spring 74, the tension of which is regulated by the screw threaded plug 75 which latter is provided with a squared end 76 whereby it may be rotated by a suitable wrench.

The shaft 77 may be driven by a suitable motor as indicated in my patent and by referring to Figure 5, it will be noted that pinion gear 78 mounted on said shaft is in driving engagement with pinion gear 79 for rotating driven shaft 80 which is rigidly fixed to the inner casing F by a squared socket and broach, not shown. Clutch member 69 has a collar 100 which sets in a circular recess, not shown, in gear 79. The dasher is rigidly connected to the squared shaft 68. The bolt 66 indicates when the dasher is rotating.

Operation

Assuming that the inner casing F is filled with the ice cream mix and that the casing is suitably packed with ice, by the use of an outer casing such as shown in Figure 1 of my patent, the driving of the shaft 77 causing rotation of gears 78 and 79 and the rotation through shaft 80 of the casing F. The dasher is held stationary by the friction clutch parts 69 and 72.

When the mix has become partially solidified the resistance becomes such that the friction connection between parts 72 and 69 is overcome and clutch member 69 is rotated by means of the dasher thus relieving the torque on the drive shaft 77. At this time the bolt starts to rotate thereby giving a visual indication that the mix is frozen.

It will be understood that while there has been described herein certain specific embodiments of my invention, it is not intended thereby to have it limited or circumscribed by the specific details given, in view of the fact that this invention is susceptible to various modifications and changes which come within the spirit of this disclosure and the scope of the appended claims.

I claim:

1. In an ice cream freezer comprising an outer stationary casing, and an inner movable casing having power drive means for driving said inner casing and provided with a dasher and dasher shaft having a dasher positioning and supporting means extending across the top of the said outer casing, said dasher positioning and supporting means including a friction clutch for preventing movement of said dasher during the initial normal freezing operation, but permitting the driving of said dasher by means of and in accordance with the movement of said inner casing as the ice cream mix therein becomes solidified, said friction clutch comprising a member enclosing said dasher shaft and preventing the entry of extraneous matter to the interior of said inner casing, said member being drivingly connected to said dasher shaft and having a cylindrical outer peripheral surface and a spring pressed plunger engaging said outer cylindrical surface and mounted in said dasher positioning means and extending radially of said outer freezer casing.

2. In an ice cream freezer comprising an outer stationary casing, and an inner movable casing having power drive means for driving said inner casing and provided with a dasher and dasher shaft having a dasher positioning and supporting means extending across the top of the said outer casing, said dasher positioning and supporting means including a friction clutch for preventing movement of said dasher during the initial normal freezing operation, but permitting the driving of said dasher by means of and in accordance with the movement of said inner casing as the ice cream mix therein becomes solidified, said friction clutch comprising a member enclosing said dasher shaft and preventing the entry of extraneous matter to the interior of said inner casing, said member being drivingly connected to said dasher shaft and having a cylindrical outer peripheral surface and a spring pressed plunger engaging said outer cylindrical surface and mounted in said dasher positioning means and extending radially of said outer freezer casing, and means for adjusting the frictional engagement of said plunger against said cylindrical surface.

3. In an ice cream freezer comprising an outer stationary casing, and an inner movable casing having power drive means for driving said inner casing and provided with a dasher and dasher shaft having a dasher positioning and supporting means extending across the top of the said outer casing, said dasher positioning and supporting means including a friction clutch for preventing movement of said dasher during the initial normal freezing operation, but permitting the driving of said dasher by means of and in accordance with the movement of said inner casing as the ice cream mix therein becomes solidified, said friction clutch comprising a member enclosing said dasher shaft and preventing the entry of extraneous matter to the interior of said inner casing, said member being drivingly connected to said dasher shaft and having a cylindrical outer peripheral surface and a spring pressed plunger engaging said outer cylindrical surface and mounted in said dasher positioning means and extending radially of said outer freezer casing, and means for adjusting the frictional engagement of said plunger against said cylindrical surface, said dasher supporting and positioning means further including a central hollow portion for housing said member having a cylindrical outer surface, and said power drive means including a motor mounted on and below said outer casing and a drive shaft extending through said casing and drivingly engaging said inner casing.

4. In an ice cream freezer comprising an outer stationary casing, and an inner movable casing having power drive means for driving said inner casing and provided with a dasher and dasher shaft having a dasher positioning and supporting means extending across the top of the said outer casing, said dasher positioning and supporting means including a friction clutch for preventing movement of said dasher during the initial normal freezing operation, but permitting the driving of said dasher by means of and in accordance with the movement of said inner casing as the ice cream mix therein becomes solidified, said friction clutch comprising a member enclosing said dasher shaft and preventing the entry of extraneous matter to the interior of said inner casing, said member being drivingly connected to said dasher shaft and having a cylindrical outer peripheral surface and a spring pressed plunger engaging said outer cylindrical surface and mounted in said dasher positioning means and extending radially of said outer freezer casing, and means for adjusting the frictional engagement of said plunger against said cylindrical surface, said dasher supporting and positioning means further including a central hollow portion for housing said member having a cylindrical outer surface, and said power drive means including a drive shaft extending through said central hollow portion, and gears in said hollow portion drivingly connecting said drive shaft to said inner casing for driving the same.

DAVID C. WILLIAMS.

REFERENCES CITED

The following references are of record in the file of this patent:

UNITED STATES PATENTS

| Number | Name | Date |
| --- | --- | --- |
| 1,492,468 | Johnston et al. | Apr. 29, 1924 |
| 1,772,456 | Cole | Aug. 12, 1930 |
| 1,798,219 | Parker | Mar. 31, 1931 |
| 1,915,220 | Fegley et al. | June 20, 1933 |
| 2,148,333 | Williams | Feb. 21, 1939 |